United States Patent
Nussbaumer et al.

(10) Patent No.: US 6,370,122 B1
(45) Date of Patent: Apr. 9, 2002

(54) METHOD FOR MONITORING AND CHECKING SUBSCRIBER CONNECTIONS TO ISDN

(75) Inventors: Iwan Nussbaumer, Liesberg-Dorf; Jürg Thimm, Muri; Charles Zehnder, Binningen, all of (CH)

(73) Assignee: Siemens Schweiz AG, Zurich (CH)

( * ) Notice: Subject to any disclaimer, the term of this patent is extended or adjusted under 35 U.S.C. 154(b) by 0 days.

(21) Appl. No.: 09/147,662
(22) PCT Filed: Mar. 20, 1997
(86) PCT No.: PCT/CH97/00116
  § 371 Date: Feb. 9, 1999
  § 102(e) Date: Feb. 9, 1999
(87) PCT Pub. No.: WO98/09420
  PCT Pub. Date: Mar. 5, 1998

(30) Foreign Application Priority Data

Aug. 27, 1996 (CH) .............................................. 2101/96

(51) Int. Cl.[7] .......................... H04J 3/12; H04M 11/00
(52) U.S. Cl. ...................... 370/264; 370/524; 370/904; 379/93.05
(58) Field of Search ................................ 370/236, 237, 370/241, 248, 250, 251, 264, 522, 524, 529, 904, 257, 363, 385; 379/93.05, 93.07, 231, 93.15

(56) References Cited

U.S. PATENT DOCUMENTS

| | | | | |
|---|---|---|---|---|
| 4,656,623 A | * | 4/1987 | Dalby, Jr. et al. | 370/524 |
| 5,621,731 A | * | 4/1997 | Dale et al. | 370/231 |
| 5,625,685 A | * | 4/1997 | Allegranza et al. | 370/385 |

FOREIGN PATENT DOCUMENTS

| | | |
|---|---|---|
| EP | 603692 | 6/1994 |
| EP | 661859 | 7/1995 |
| EP | 668706 | 8/1995 |
| EP | 710045 | 5/1996 |

OTHER PUBLICATIONS

Kuzyszyn et al. "ISDN Protocol and Service Verification and Performance Testing," International Conference on Communications, ICC–87, session 38, paper 6, vol. 3, (1987) XP002006268.*

Martin, "Kommunikation mit ISDN," *Markt & Technik*, Verlag, Munich, p. 105 (1988).

(List continued on next page.)

*Primary Examiner*—Hassan Kizou
*Assistant Examiner*—Afsar M. Qureshi
(74) *Attorney, Agent, or Firm*—Herbert L. Lerner; Laurence A. Greenberg; Werner H. Stemer

(57) ABSTRACT

ISDN telecommunications network and method for the monitoring and checking of subscriber connections of the ISDN telecommunications network. The telecommunications network includes a plurality of subscriber connections, and at least one checking station that is connectable to a desired one of the plurality of subscriber connections. Each of the plurality of subscriber connections includes an answering station adapted to receive messages from and send messages to the checking station. The at least one checking station includes a device to establish a connection with the desired one of the plurality of subscriber connections, and the answering station is adapted to be placed into a monitoring state. Signaling information exchanged over the D channel associated with the desired one of the plurality of subscriber connections is transmitted to the checking station. The method includes setting up a connection, via the checking station, between the checking station and the desired subscriber connection, and placing the answering station in a monitoring state, wherein signaling information exchanged over the D channel associated with the desired subscriber connection is transmitted to the checking station.

10 Claims, 3 Drawing Sheets

OTHER PUBLICATIONS

Kanbach et al., *ISDN—Die Technik*, Hüthig Verlag, Heidelberg, pp. 73–73; 105–109; and 260–266 (1990).

Kuzyszyn et al., "ISDN Protocol and Service Verification and Performance Testing," *International Conference on Communications*, ICC–87, Session 38, Paper 6, vol. 3 (1987).

Chi, "ISDN–PAS: An ISDN Performance Analysis System," *Proceedings of the Region 10 Conference on Computer and Communication Systems*, vol. 2(1990).

Baughan et al., "CCITT Standards for the ISDN Data Link Layer," *International Symposium on Subscriber Loops and Services*, No. SYMP 7 (1986).

* cited by examiner

METHOD FOR MONITORING AND CHECKING SUBSCRIBER CONNECTIONS TO ISDN

CROSS REFERENCE TO RELATED APPLICATION

The present invention is a U.S. National Stage of International Application No. PCT/CH97/00116, filed Mar. 20, 1997, and claims priority under 35 U.S.C. §119 of Swiss Patent Application No. 2101/96 filed Aug. 27, 1996.

BACKGROUND OF THE INVENTION

1. Field of the Invention

The present invention is related to a method and device for monitoring and checking subscriber connections of an ISDN telecommunications network.

2. Discussion of Background Information

Operators of communications networks are increasingly interested in central network management for reasons of expense and costs. Concretely, the requirement exists to be able to administer (monitoring and checking, in particular) the entire network, including the network terminations, from a central location. Thus, for instance, malfunctions at a subscriber connection (connection for an, in itself arbitrary, terminal device) of the network are to be identified and remedied quickly and economically from a central location. A prerequisite for this is that the subscriber connections can be monitored and checked with regard to certain characteristics in order to then introduce any necessary measures quickly (remote support).

SUMMARY OF THE INVENTION

The present invention provides a method with which, from any desired connection of an ISDN telecommunications network, other ISDN connections can be accessed, and their behavior monitored and checked.

The present invention provides a telecommunications network that includes subscriber connections and at least one checking station to be connected to a desired subscriber connection to monitor the desired subscriber connection. Each subscriber connection to be monitored includes an answer station that can receive messages from and send messages to the checking station. According to the method, the checking station sets up a connection over the telecommunications network to the subscriber connection to be monitored, and, after the connection between the checking station and the answering station is set up, the answering station is placed in a monitoring state in which the signaling information exchanged over the D channel associated with the desired subscriber connection is transmitted to the checking station.

The method in accordance with the invention offers the following advantages: any subscriber connections of an ISDN can be monitored and checked across networks, independently of location, i.e. from any desired other ISDN connection. The checking station can be installed at the closest ISDN connection, and thereby quickly access any desired remote ISDN connection. In many cases, it is therefore no longer necessary to monitor and check a subscriber connection on site, which is less resource-intensive for the network operator and thus more economical for the customer. In particular, the access to any desired subscriber connections permits rapid and efficient fault localization and error correction from any desired subscriber connection of the telecommunications network.

Accordingly, the present invention is directed to a method for the monitoring and checking of subscriber connections of an ISDN telecommunications network. The telecommunications network includes subscriber connections and at least one checking station adapted to be connected to a desired subscriber connection to monitor the desired subscriber connection, and each subscriber connection includes an answer station adapted to receive messages from and send messages to the checking station. The method includes setting up a connection, via the checking station, between the checking station and the desired subscriber connection, and placing the answering station in a monitoring state, wherein signaling information exchanged over the D channel associated with the desired subscriber connection is transmitted to the checking station.

In accordance with another feature of the present invention, the answering station may be placed in the monitoring state after the connection between the checking station and the answering station.

According to another feature of the present invention, the method may further include sending a command to the answering station to set up a connection to another subscriber connection, wherein the answering station is in the monitoring state when the command is sent.

According to still another feature of the present invention, the method may further include transmitting the signaling information to the checking station on the D channel.

According to a further feature of the present invention, the method further including transmitting the signaling information is transmitted to the checking station on a B channel.

In accordance with still another feature of the present invention, the answering station may be integrated in a network termination unit associated with the desired subscriber connection.

In accordance with a still further feature of the present invention, the method further includes evaluating, in the checking station, the signaling information received at the checking station.

The present invention is also directed to an ISDN telecommunications network. The telecommunications network includes a plurality of subscriber connections, and at least one checking station that is connectable to a desired one of the plurality of subscriber connections. Each of the plurality of subscriber connections includes an answering station adapted to receive messages from and send messages to the checking station. The at least one checking station includes a device to establish a connection with the desired one of the plurality of subscriber connections, and the answering station is adapted to be placed into a monitoring state. Signaling information exchanged over the D channel associated with the desired subscriber connection is transmitted to the checking station.

According to another feature of the present invention, the answering station is integrated in a network termination unit associated with the desired subscriber connection.

In accordance with still another feature of the present invention, the at least one checking station further includes a device for evaluating the signaling information received from the desired subscriber connection.

In accordance with yet another feature of the present invention, the at least one checking station is connectable to another one of the plurality of subscriber connections through the answering station.

Other exemplary embodiments and advantages of the present invention may be ascertained by reviewing the present disclosure and the accompanying drawing.

BRIEF DESCRIPTION OF THE DRAWINGS

The invention is explained by way of example in greater detail below with the aid of a drawing.

DETAILED DESCRIPTION OF THE PRESENT INVENTION

Figure 1:
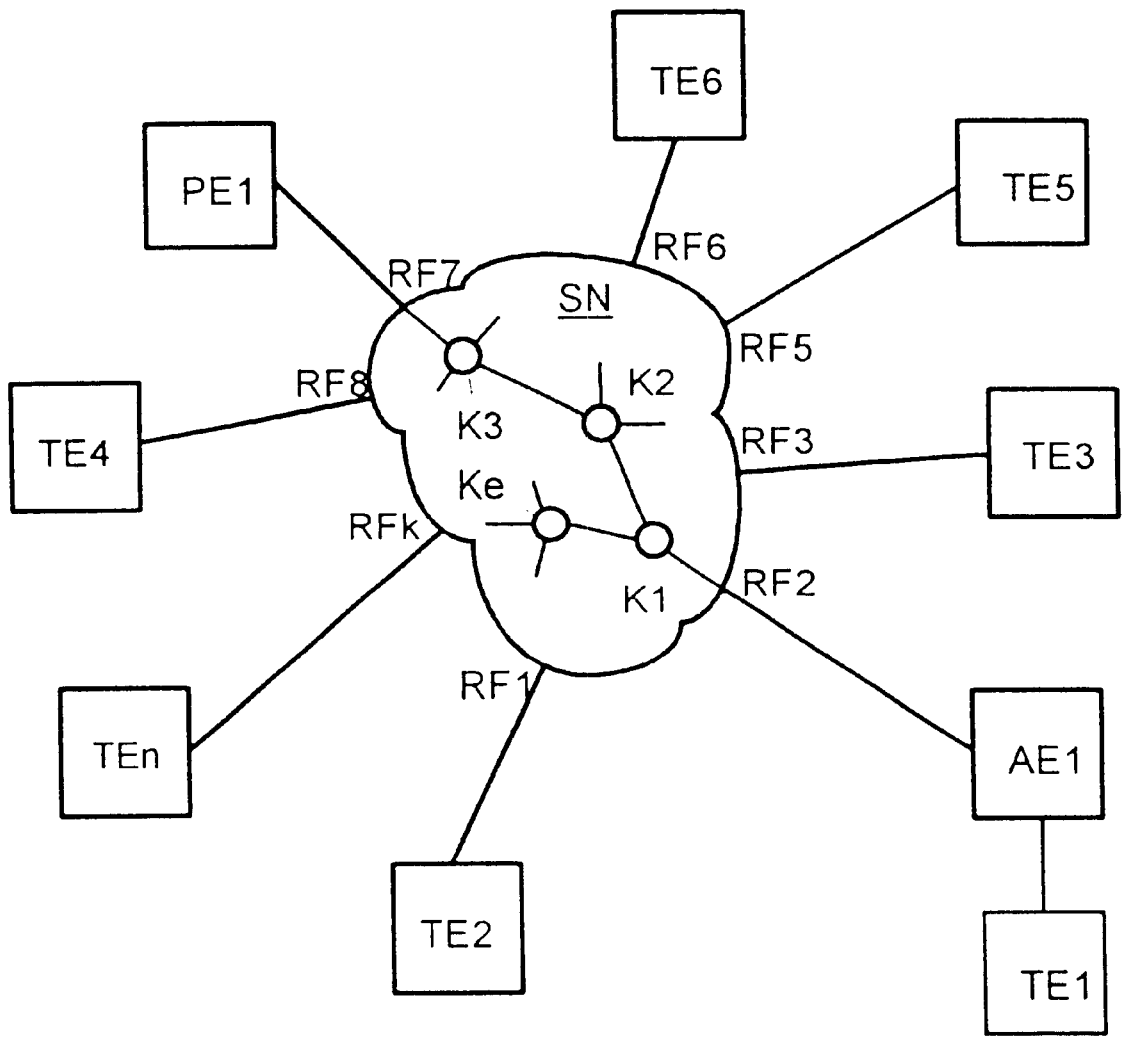
FIG. 1 shows a telecommunications network in which the method in accordance with the invention may be used.

FIG. 1 shows a telecommunications network including of a switching network SN and various terminal devices TE2 . . . TEn connected to the switching network SN via reference points RF and via network terminations (network termination NT) that are not shown. Further, a checking station PE1 is connected to telecommunications network SN through a reference point RF7. Moreover, through an answer station AE1, terminal device TE1 is connected to reference point RF2. The switching network SN is a network constructed in conformance with ISDN standards, to the subscriber lines (basic connections=basic channel) provided at the reference points RF of which can be connected any desired terminal devices, such as telephone sets, terminal adapters, etc. The switching network SN can include in a known manner of network nodes K1 through Ke, which correspond to telecommunications central offices and are connected to one another via trunk groups.

Figure 2:
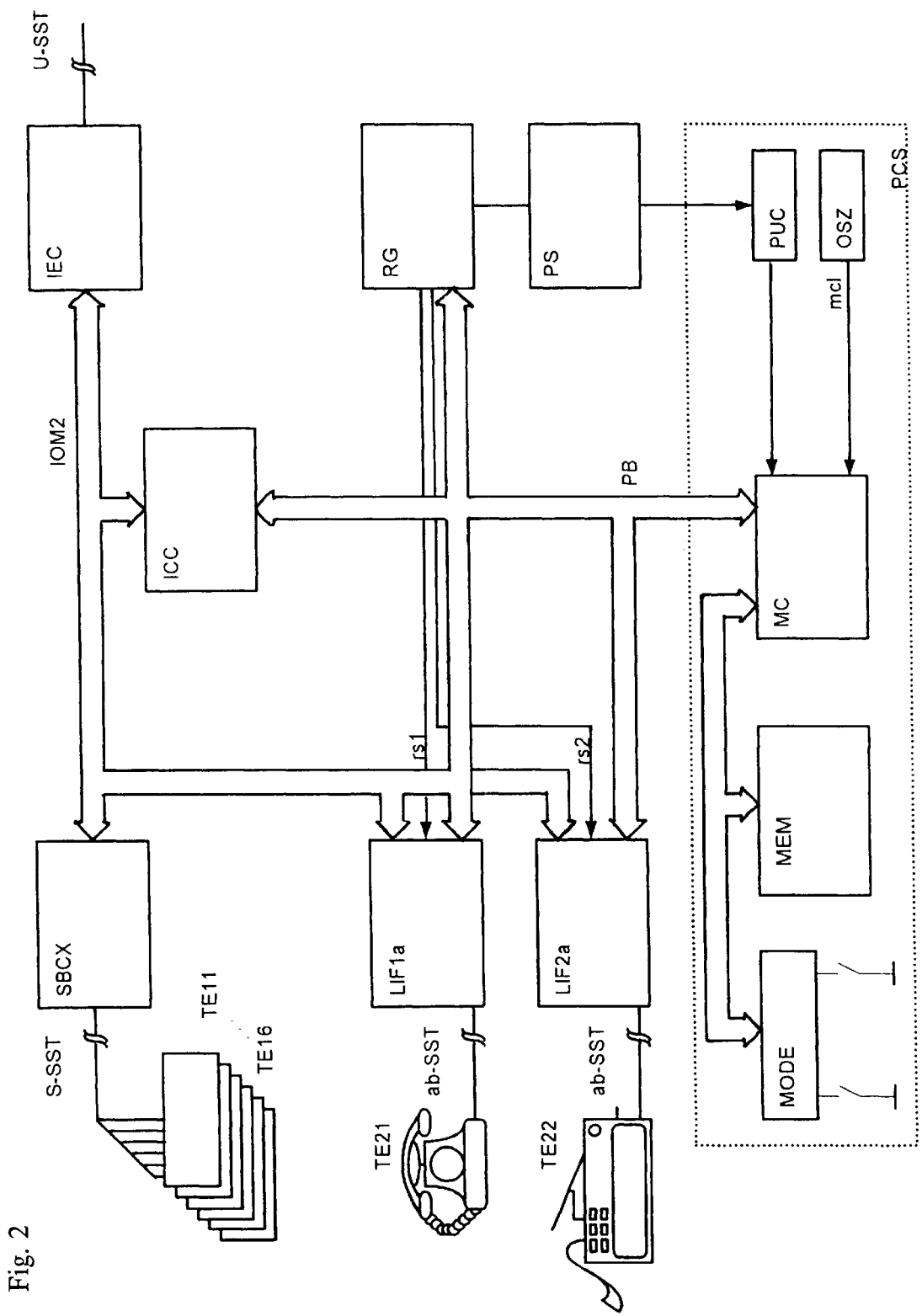
FIG. 2 shows the schematic block diagram of an answer station for the performance of the method in accordance with the invention.

FIG. 2 shows a network termination unit known from EP 0 668 706 A2 that, with additional special functions explained further below, can be used as an answer station for carrying out the method in accordance with the invention. However, for carrying out the method, it is not necessary to use an answer station that also has network termination functions. Nevertheless, if one proceeds from the assumption that, at many subscriber connections of a digital telecommunications network, a network termination with only digital or with both analog and digital interfaces is to be provided even today, it is advantageous to combine in one unit the functions for network termination and answer stations as in the example described here. In this way, the user also obtains, simultaneously with the network termination, the necessary devices with which his subscriber connection can be accessed in accordance with the invention.

The unit illustrated in FIG. 2 has two separate bus systems, IOM2 (2B+D channel bus) and PB (processor bus). Through this unit, analog subscriber terminal devices TE and up to six digital subscriber terminal devices TE11 . . . TE16 can be connected to a central exchange via a U interface of the ISDN telecommunications network. The first bus system IOM2 connects an echo compensation module IEC—that is connected to the U interface—to a communication controller ICC and also to an S interface module SBCX and two ab interface modules LIF1a and LIF2a. The S interface module SBCX is connected via an S interface to the digital terminal devices TE11 . . . TE16 and the ab interface modules LIF1a and LIF2a are each connected to an analog terminal device TE21 or TE22. The terminal device TE22 may be, for example, a telecopier (facsimile machine). The second bus system PB connects the communication controller ICC, a ring signal generator RG and the ab interface modules LIF1a or LIF2a to a processor system PCS, which comprises a processor MC, a storage module MEM, an oscillator OSZ and a switching unit MODE, provided for setting the operating mode. Moreover, for the supply of power, the processor MC is connected to the power supply unit PS via a power-up controller PUC. The status of the supply voltage is signaled to the processor MC through the power-up controller PUC so that the necessary switch-on and switch-off (power up, power down) routines can be carried out at the proper times. For emergency operation, upon failure of the local power supply, it is often urgently necessary for the power consumption of the circuit arrangement to be reduced sharply. In this case, power is supplied by the associated telecommunications central office. For this purpose, provision is made for only one of the (analog or digital) terminal devices TE11 . . . TE22 to be placed in operation. If, for instance, one of the analog terminal devices TE21; TE22 is activated, all additional unneeded modules are placed in a power-down mode (mode with minimal power consumption) by the processor MC, or only the required modules are brought from the power-down mode to the operational state.

The echo compensation module IEC connected to the associated telecommunications central office via a two-wire line makes possible the transmission of data with the common frequency method (see Dr. H. E. Martin, *Kommunikation mit ISDN*, Markt & Technik Verlag, Munich, 1988, page 105, figure 6.15).The transmitted data are assigned, in accordance with the standard, to one of two digital speech channels (B channels) and one digital signaling channel (D channel). The signaling data transmitted over the D channel are transmitted from the communication controller ICC to the processor MC and evaluated by the latter. The communication controller ICC (ISDN Communication Controller; for example, PEB 2070 manufactured by Siemens AG) performs the D channel connection functions or is provided for implementation of the D channel protocol. Moreover, the processor MC has, via the communication controller ICC and the IOM-2 bus, access to the echo compensation module IEC and to the module SBCX, which are programmed by the processor MC in accordance with the configuration data present. The communication controller ICC, which is controlled by the processor MC, connects the B channels either to the module SBCX or to the ab interface modules LIF1a or LIF2a. If both B channels are already being used by the module SBCX, no idle tone can be switched through to the module LIF1a or LIF2a. For this situation, an internally generated all-trunks-busy tone (for example, 425 Hz) is applied at the ab interface modules LIF1a or LIF2a. Advantageously, interrupt signals are sent from the processor MC to the communication controller ICC, for example at an 8 kHz rate, after which a sampled value of the all-trunks-busy tone is sent at each interrupt via the first bus system IOM2 to the ab interface modules LIF1a or LIF2a. In this way, additional tones (e.g. the idle tone) can be sent to the ab interface modules LIF1a or LIF2a. However, the all-trunks-busy tone, call-charge pulses, or additional tones can of course be generated in any desired fashion, i.e. through software or by division from a reference frequency.

Figure 3:
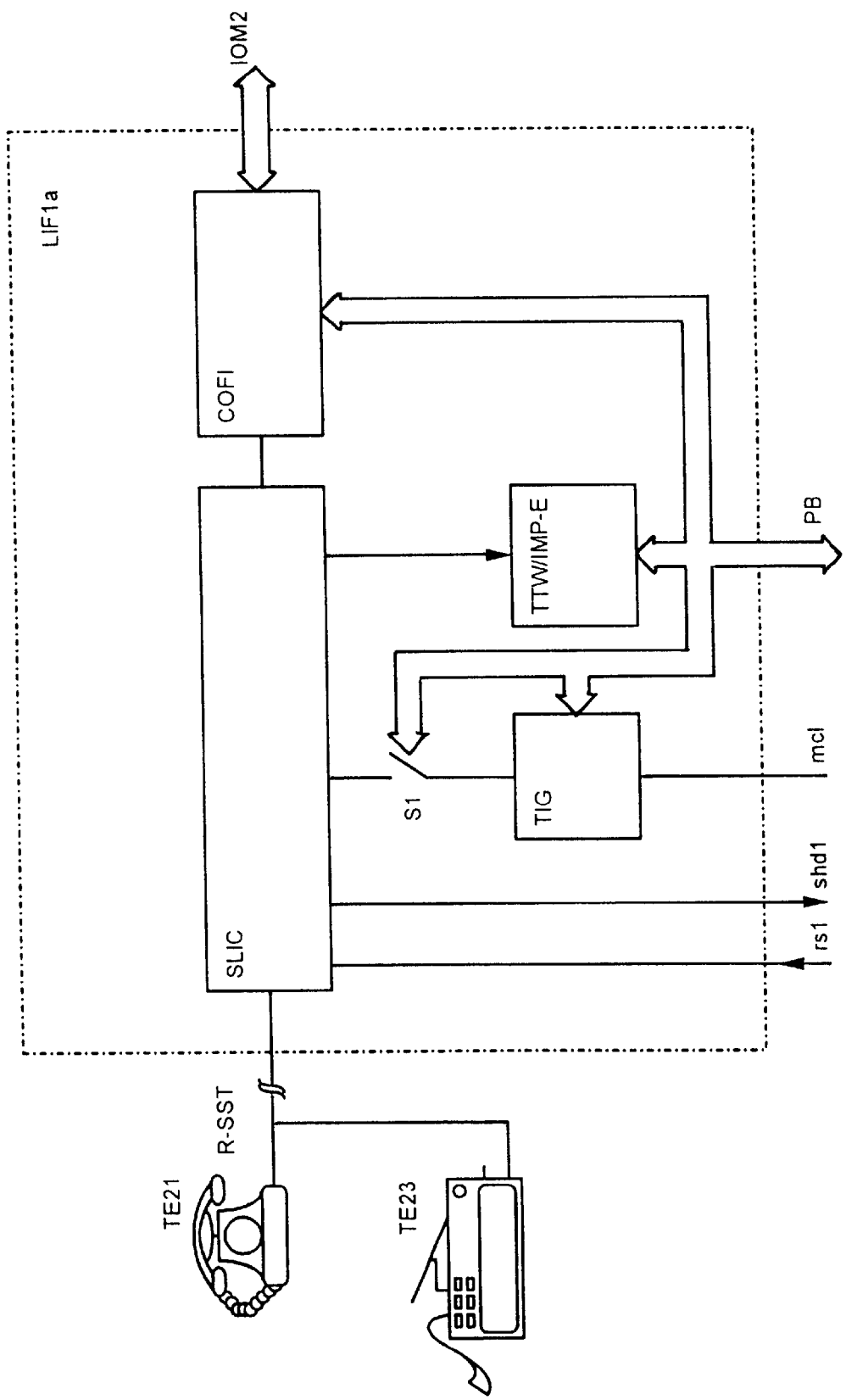
FIG. 3 shows further details of the answer station.

The module LIF1a shown in FIG. 3, that is connected to the analog terminal device TE21, and if necessary to another terminal device TE23 (e.g. group 3 facsimile device) provided parallel thereto, has a converter module COFI that is connected on one side to the IOM2 bus and on the other side to the terminal device TE21 via a line module SLIC and the ab interface ab-SST. The converter module COFI serves as a digital-to-analog converter in the direction of the terminal device, and as an analog-to-digital converter in the direction of the ISDN. The line module SLIC is further connected to a ring voltage generator RG (see lines rs1, rs2), a tone and pulse dialing receiver TTW/IMP-E, and also via a switch S1 to a metering pulse generator TIG which is supplied with a reference frequency signal mcl by the oscillator OSZ. The switch S1, the metering pulse generator TIG, the ring voltage generator RG and the tone and pulse dialing receiver TTW/IMP-E are connected to the processor MC via the processor bus PB for control purposes and for data traffic. In this context, the division ratio of the metering pulse generator TIG connected to the oscillator OSZ is determined by the processor MC. A frequency fl (e.g. 12 kHz) for the metering pulses is generated by appropriate division from the reference frequency signal mcl supplied from the oscillator OSZ. The metering pulses can also be generated by software as well as by division from a main frequency. Through actuation of the switch S1 (switch S2 for module LIF2a is not shown), the appropriate signals are supplied to the line module SLIC. The dialing signals generated by the terminal device TE21 are provided to the processor MC by the tone and pulse dialing receiver TTW/IMP-E via the processor bus PB. In this context, the tone and pulse dialing receiver TTW/IMP-E can be realized software or hardware as desired. The connection is set up, if a free B channel is available, in cooperation between the processor MC and the communication controller ICC. If the analog terminal device TE21 or TE22 has special keys (for example, # (pound sign) and/or * (star)), instructions can be transmitted to the processor MC from the terminal device TE21 or TE22. For example, the subscriber numbers of the ab interfaces, the device type with the HLC (High Layer Compatibility) information, and the desired emergency operating mode (emergency operation through ab interface or S interface or no emergency operation) can be specified to the processor MC or test sequences can be invoked.

The line module SLIC performs the classic BORSCHT functions (subscriber power supply, overvoltage protection, call control, loop monitoring and signaling) with the exception of analog-to-digital conversion (coding), which is carried out in the converter module COFI. Loop monitoring, an answer signal shd1 (switch hook detection) is sent to the processor MC via the processor bus PB or a separate line when the receiver is lifted. The line module SLIC follows the converter module COFI (Codec Filter), which serves for conversion of the analog subscriber signal into a PCM digital signal and vice versa, as well as bandwidth limiting and filtering. Frequency response, impedance matching and amplification/attenuation of this module are programmable by the processor MC in preferred embodiments.

The IOM2 bus systeme includes of a bit clock line and a frame clock line in addition to two data lines, of which each is provided for data traffic in one direction. The IOM interface known to the expert is described, for example, in A. Kanbach / A. Körber, *ISDN—Die Technik*, Hüthig Verlag, Heidelberg 1990, on pages 260–266. Preferably the IOM2 interface (IOM Revision 2), which arose as a refinement of the IOM1 interface, is used for the first bus system IOM2. Especially advantageous in this interface is that information from the devices connected to the IOM2 bus system can be exchanged among those devices without using the B channels.

The echo compensation module IEC and the S interface module SBCX can be realized through the commercially available devices Siemens PEB 2091 (U interface device) or Siemens PEB 2081 (S interface device).

To avoid collisions in the D channel that occur when the digital terminal devices TE11, . . . ,TE16 simultaneously initialize a connection set-up, the known D channel access control is employed, as is described in A. Kanbach / A. Körber, *ISDN—Die Technik*, Hüthig Verlag, Heidelberg 1990, on pages 105–109.

To avoid collisions in the D channel that occur when digital and analog terminal devices TE11, . . . ,TE16 and TE21, . . . ,TE24 simultaneously initialize a connection set-up, the following measures are taken: on principle, only one terminal device TE can access the D channel at a time. This is achieved through a collision detection system used for each terminal device TE, which is made possible through reflection of the transmitted signaling data in an echo channel. To avoid collisions during connection set-up for an analog terminal device TE21 or TE22, the S interface module SBCX monitors the data received over the D channel. Upon receipt of a D channel request (request for access permission) from the communication controller ICC, the S interface module SBCX gives the communication controller ICC the authorization to access the D channel if it is not itself using the D channel. At the same time, all digital terminal devices TE11, . . . ,TE16 are prevented by the S interface module SBCX from accessing the D channel. This is achieved in that the E channel (echo channel) is set to zero. The communication controller ICC is therefore able to send an HDLC frame to the D channel without a collision occurring. On the basis of the signaling data sent from the communication controller ICC, a connection set-up for the analog terminal devices is made possible, such as is described, for example in A. Kanbach / A. Körber, *ISDN—Die Technik*, Hüthig Verlag, Heidelberg 1990, on pages 73–75.

Each subscriber connection of the telecommunications network shown in FIG. 1 that is to be accessed in accordance with the invention or that is to be monitored and checked from a checking station PE1 (FIG. 1) in accordance with the invention must be equipped with an answer station AE that is capable of performing the functions described below. These functions can be implemented through appropriate programming of the processor MC and the communication controller ICC in the described network termination device (FIG. 2), which thereby becomes an answer station AE for carrying out the method. The method proceeds as follows:

At the instigation of the operator, the checking station PE1 sets up a normal communication connection through the switching network SN, for example to the answer station AE1 with the terminal device TE1 (FIG. 1), whose connection is to be monitored and checked. Following establishment of the connection between the checking station PE1 and the answer station AE1, the checking station PE1 issues the "monitor" command. By way of the D channel (signaling channel) or by way of a B channel (user data channel), this command reaches the communication controller ICC, and from there reaches the processor MC in the answer station AE1 via the processor bus PB. The processor MC interprets the command and additionally checks whether the checking station PE1 is authorized to issue such a command. If appropriate, the processor MC gives the communication controller ICC the task of activating the "monitor" function in the answer station AE1.

In accordance with this function, the communication processor ICC now inserts all further incoming and outgoing signaling information detected on the D channel in the D channel leading to the checking station PE1. Prior to its forwarding to the checking station PE1, the signaling information is placed, as necessary, in a form suitable for reliable communication (formation of check sums, frame synchronization, etc.) with the checking station PE1.

The answer station AE1 is thus in a monitoring state in which it forwards to the checking station PE1 all transmitted signaling information exchanged on the D channel (incoming and outgoing) during the set-up or release of a connection outgoing from its subscriber connection or incoming to its subscriber connection (for example, from terminal device TE1 to terminal device TE2). Even the information exchanged on the associated D channel during the existence of the connection between the terminal devices TE1 and TE2, such as charge information, etc. is forwarded to the checking station PE1 in this manner. In the monitoring state, the answer station AE1 "reflects" the D channel information to the checking station PE1, so to speak.

The checking station PE1 receives the information forwarded to it on the D channel, checks the syntax and semantics thereof, and stores it. From the received information (layer 3 information), the checking station PE1 prepares a log and places the latter in a form that is suitable for understandable viewing. The information can then be displayed on a screen and/or printed out in this form, and is thus available to the network operator's operating or maintenance personnel in a directly interpretable form in the checking station PE1.

As a result of the D channel information being forwarded to the checking station PE1 on the D channel as described, the monitoring and checking of a subscriber connection does not hinder the relevant subscriber, since both B channels of his subscriber connection are unrestrictedly available. In a variant of the method described, provision can also be made, however, for the communication processor ICC to first forward all incoming and outgoing signaling information (layer 2 and 3) detected on the D channel to a memory when the answer station AE1 is in the monitoring state. The stored information can then be called up by the checking station PE1 at any desired later time, and, rather than being forwarded on the D channel, be forwarded to the checking station PE1 on one of the two B channels leading to the checking station PE1, where it is then processed as described.

As soon as the answer station AE1 has attained the monitoring state as described, two possibilities exist: The operator at the checking station PE1 instructs the subscriber at terminal device TE1 to set up a connection from his terminal device TE1 to another terminal device, for example terminal device TE2, whereupon monitoring of the D channel signaling takes place in the checking station PE1 as described above. It is also possible, however, to leave the answer station AE1 that is in a monitoring state in this state during a certain period. In this way, a chance set-up of a connection, i.e. one initiated from the terminal device TE1 to another terminal device or vice versa without an express request to the subscriber at terminal device TE1, can be monitored and checked with regard to correct sequence of operations. The answer station AE1 thus "observes" during a freely selectable period of time any exchange of signaling characters on the D channel and reports its observations back to the checking station PE1 as described above, either continuously or at a later point in time.

With the method described, the checking station PE1 makes possible real time monitoring of the D channel signaling at a network connection. Since, in accordance with ITU-T recommendation Q.931, all messages and their exchange are defined for signaling in the D-channel, important statements can be made from a central location very quickly and across networks about the behavior of any subscriber connections of in principle any desired size telecommunications network. After analysis of the available log in the checking station PE1, such things as causes for reported faults at the network connection in question can be determined and the faults can be quickly remedied. The sole condition is that the relevant subscriber connections must be equipped with an answer station AE in which the described "monitor" function is implemented.

Monitoring also allows the network operator to verify statements of a user regarding malfunctions of his subscriber connection and if necessary to quickly introduce appropriate measures. In the simplest case, the checking station PE1 can be realized with a personal computer that is connected as a terminal device to the ISDN telecommunications network.

Since the checking station PE1 can be operated at any digital subscriber connection of an ISDN network of any extent, the maintenance personnel is able to provide efficient support to the user practically independent of location. The network operator can fulfill the desires and demands of his customers very quickly and economically.

In a further embodiment of the invention, once the answer station AE1 has achieved the monitoring state, the checking station PE1 can transmit certain signaling information to the answer station AE1 on the D channel and thereby cause the answer station AE1 to automatically and selectively set up a connection to another terminal device of the telecommunications network SN. The communication controller ICC in the answer station AE1 then ensures that the signaling information exchanged on the D channel between the two terminal devices participating in the connection is forwarded to the checking station PE1 in the described way. The checking station PE1 can in turn verify whether the desired connection is being set up properly. In this way, it is possible for the checking station PE1 to selectively stimulate a network connection and monitor whether the subscriber connection reacts appropriately.

The monitoring state of the answer station AE1 remains in effect until it is terminated by the checking station PE1.

What is claimed is:

1. A method for the monitoring and checking of subscriber connections of an ISDN telecommunications network, the telecommunications network includes subscriber connections and at least one checking station adapted to be connected to a desired subscriber connection to monitor the desired subscriber connection, wherein each subscriber connection includes an answer station adapted to receive messages from and send messages to the checking station, the method comprising:

setting up a connection, via the checking station, between the checking station and the desired subscriber connection; and placing the answering station in a monitoring state, wherein signaling information exchanged over the D channel associated with the desired subscriber connection is transmitted to the checking station.

2. The method in accordance with claim 1, further comprising:

establishing connection between the checking station and the answering station; and placing the answering station in the monitoring state after the connection between the checking station and the answering station.

3. The method in accordance with claim 1, further comprising sending a command to the answering station to set up a connection to another subscriber connection, wherein the answering station is in the monitoring state when the command is sent.

4. The method in accordance with claim 1, further comprising transmitting the signaling information to the checking station on the D channel.

5. The method in accordance with claim 1, wherein the answering station is integrated in a network termination unit associated with the desired subscriber connection.

6. The method in accordance with claim 1, further comprising evaluating, in the checking station, the signaling information received at the checking station.

7. An ISDN telecommunications network comprising:

a plurality of subscriber connections;

at least one checking station that is connectable to a desired one of said plurality of subscriber connections;

each of said plurality of subscriber connections comprising an answering station adapted to receive messages from and send messages to said at least one checking station;

said at least one checking station including a device to establish a connection with said desired one of said plurality of subscriber connections; and said answering station being adapted to be placed into a monitoring state, wherein signaling information exchanged over the D channel associated with said desired one of said plurality of subscriber connections is transmitted to said checking station.

8. The telecommunication network in accordance with claim 7, said answering station being integrated in a network termination unit associated with said desired one of said plurality of subscriber connections.

9. The telecommunication network in accordance with claim 7, said at least one checking station further including a device for evaluating the signaling information received from said desired one of said plurality of subscriber connections.

10. The telecommunication network in accordance with claim 7, said at least one checking station is connectable to another one of said plurality of subscriber connections through said answering station.

* * * * *